June 3, 1930. G. M. GEST 1,761,075
UNDERGROUND CONDUIT
Filed Aug. 11, 1925
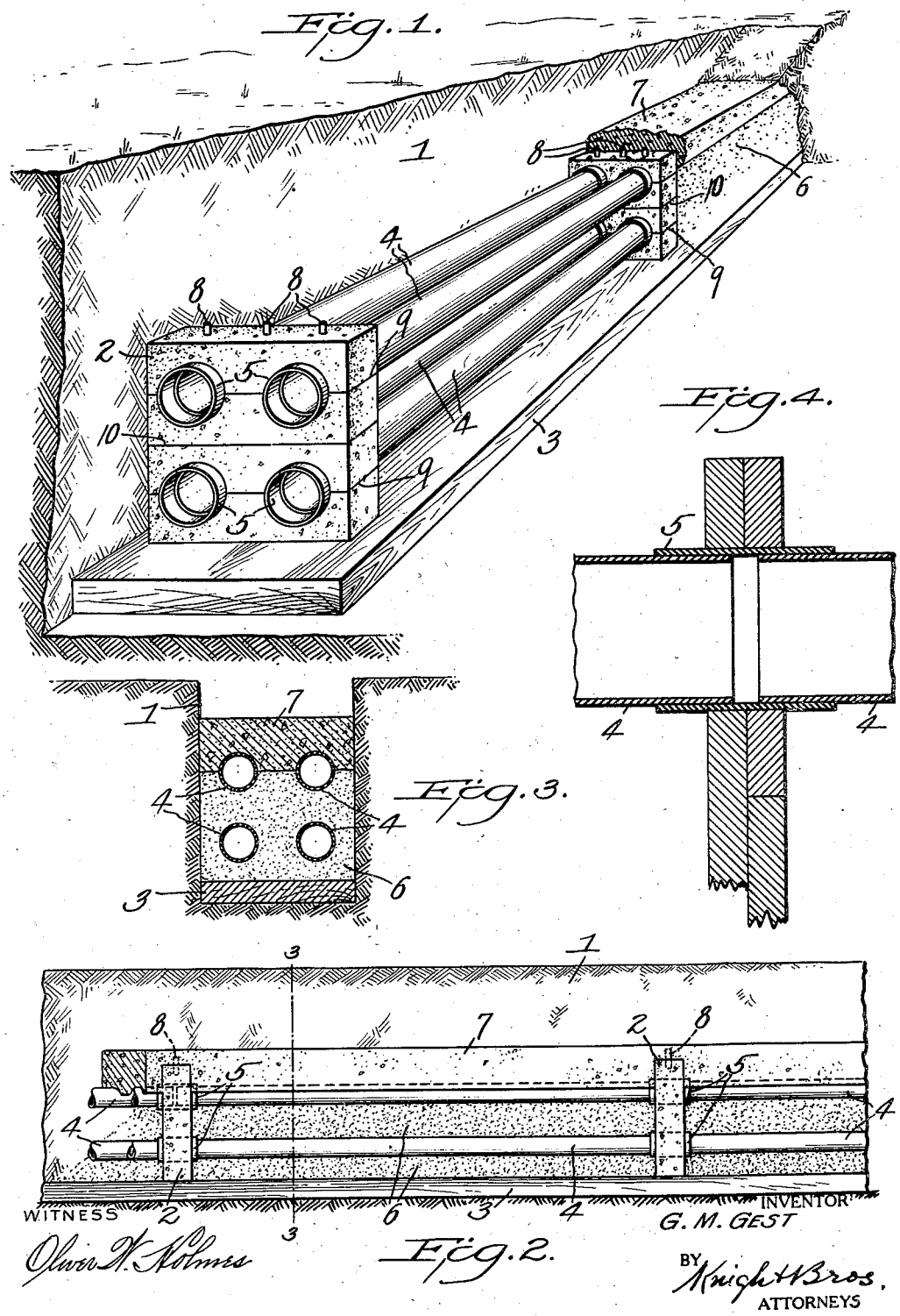
INVENTOR
G. M. GEST
BY Knight Bros.
ATTORNEYS Patented June 3, 1930

1,761,075

UNITED STATES PATENT OFFICE

GUION M. GEST, OF NOROTON, CONNECTICUT

UNDERGROUND CONDUIT

Application filed August 11, 1925. Serial No. 49,551.

This invention relates more especially to an improved underground conduit construction which may be built up continuously of inexpensive materials for any required distance and by means of unskilled labor.

The general object of my invention is to provide an improved underground conduit construction of this character which shall have the following advantages.

1. The ducts or pipes included in the structure may be made of structurally weak material, such, for example, as indurated wood fiber which possesses many advantages for work of this character.

2. The construction work involves the setting-up and arrangement of relatively light-weight parts of simple construction which require no refined adjustments of complicated parts.

3. The structurally weak ducts or pipes may be permanently located and firmly anchored in loose dirt or other material confined between the walls of a trench or other confining walls.

4. The superimposed continuous slab of self-hardening material which is hardened in postion on top of the built-up structure constitutes a protective reenforcement which unites the parts and binds them into a unitary whole.

5. The only operations involved are of a simple nature and may be carried on by unskilled labor.

The most important condition governing the kind of pipe and the method in which it is laid, is a matter of expense, as in some locations the question of putting the wires underground rather than stringing them on poles overhead, rests entirely upon whether the conduits can be furnished sufficiently cheap, due consideration being always had of course to the permanency of the work. Conduit pipe made of indurated wood fiber possesses many advantages for this work. It is insulating, non-inductive, non-corrodable and easily handled and worked, and is cheap. It has been used extensively, but to get the most satisfactory results has generally had to be embedded in a block of concrete, and this makes it too expensive for many locations.

One of the objects of my invention is to provide an improved underground conduit construction by means of which ducts or pipes made of structurally weak material may be built up in successive tiers within an excavated trench or between the laterally-spaced walls of any suitable passageway by means of supporting and spacing blocks which are arranged transversely with respect to said trench or passageway and below, above, and between said successive tiers of said ducts or pipes.

One of the specific objects of my invention is to provide an improved built-up construction for underground conduits comprising successive tiers of ducts or pipes arranged between the laterally-spaced walls of a trench or passageway and positioned by suitable duct-supports arranged transversely at longitudinally-spaced intervals along said trench or passageway. Said duct-positioning supports preferably comprise duct-spacing blocks arranged below, intermediately to, and above the ducts. Said ducts and duct-spacing blocks may be bedded in with loose dirt or other suitable material up to a surface approximately including the axes of the uppermost ducts or pipes which may then be covered with a superimposed layer of self-hardening material hardened in position upon said surface and extending between the laterally-spaced walls of said trench or passageway.

Other and further objects of my invention reside in certain features of construction recited in the appended claims.

The drawings show an embodiment of my invention. In these drawings

Figure 1 is a perspective view of one form of a four pipe construction in process of building.

Figure 2 is a longitudinal section of the same.

Figure 3 is a transverse section on the line 3—3 of Figure 2.

Figure 4 shows a wooden spacing block used as a reinforcement of a pipe joint.

According to the embodiment of my invention shown on the drawings, a bottom series of supporting and spacing blocks 2 are arranged transversely at intervals along the floor of a trench and between the side-walls 1 thereof. If desired, a supporting and aligning plank or slab 3 may be interposed between the blocks 2 and the bottom of said trench or passageway. Mounted upon the bottom series of supporting and spacing blocks 2 and seated within upwardly-presented notches formed therein are the ducts or pipes 4 of a bottom tier, the adjoining ends of these ducts or pipes being connected together by means of sleeves 5. Interposed between the bottom tier of pipes or ducts and the tier of pipes or ducts thereabove, are intermediate spacing blocks provided with notches adapting them to interlock with both of said tiers of pipes or ducts. As shown in Figure 2, a bed 6 of loose dirt or other suitable material has been tamped in around the pipes or ducts up to a level which approximately includes the axes of the pipes or ducts in the upper tier, after which self-hardening material has been deposited upon this surface as well as upon the upper walls of the pipes or ducts in the upper tier to sufficient depth to embed the upper edges of the uppermost tier of spacing blocks. There is thus formed a continuous bridging slab which unites and supports the transverse supports and pipes or ducts without creating any undue strains in the latter. In effect, this construction provides a unitary bridge-like structure within which the pipes or ducts are firmly supported without being subjected to any stresses or strains other than those due to the cables extending therethrough.

If the supporting and spacing blocks 2 are cast in place, the wooden or metal forms may be made to support the pipes in their proper relation, or the holes may be made by removable forms. If the blocks are manufactured outside the trench they may be either made in one piece or in two or more pieces, the joining surfaces corresponding with the middle of the ducts as shown by the line 10 or both. When cast in place the top or bottom slab may be formed at the same time and thus form an integral monolith. It will be obvious that wood or other material may be used to form the supporting and spacing blocks. In Figure 4 is shown a supporting block made of two layers of planks, the grain of the wood of one layer lying across the grain of another layer. The construction shown may be used with any kind of pipe conduit but it is particularly adapted to fiber conduit or conduits which are not in themselves sufficiently rugged to maintain their alignment with supporting means.

It will be understood from the foregoing description that an underground conduit construction which is built up according to the method contemplated by the present invention, can be produced of any desired length by unskilled labor and with a minimum consumption of relatively inexpensive materials.

After the ducts have been laid in place the spaces between the ducts and the blocks is filled with loose material 6 such as sand or earth and this material may be packed around the ducts without danger of displacing them, owing to the rigid manner in which the ducts are held by the supporting and spacing blocks.

I claim:—

1. In an underground conduit construction, the combination with a plurality of longitudinally-spaced transversely arranged duct-positioning supports, of ducts mounted in and positioned by said duct-positioning supports, and a continuous slab of self-hardening material hardened in position on the upper surfaces of said ducts and extending across and having the upper edges of said duct-positioning supports embedded therein.

2. In an underground conduit construction, the combination with a plurality of ducts, of duct-spacing blocks arranged at longitudinally-spaced intervals below, between, and above said ducts, and a continuous top slab of selft-hardening plastic material common to and formed around the upper edges of the previously positioned uppermost duct-spacing blocks.

3. In an underground conduit construction, the combination with a plurality of ducts, of transverse duct-positioning supports for spacing said ducts laterally and vertically, said transverse duct-positioning supports being arranged at longitudinally-spaced intervals along said ducts, a filler of loose material arranged around said ducts and between said transverse duct-positioning supports, said filler having its upper surface depressed with respect to the upper edges of said transverse duct-positioning supports, and a continuous top slab of self-hardening plastic material formed in position on the upper surface of said filler and extending above said ducts across and around the upper edges of said transverse duct-positioning supports.

4. In an underground conduit construction, the combination with ducts or pipes arranged in vertically-spaced tiers within a trench and between the laterally spaced walls thereof, of duct-spacing blocks arranged below the lowermost tier of ducts, intermediately between successive tiers of said ducts and above the uppermost tier of ducts, a filling of material interposed between and disposed around said ducts or pipes to a surface intersecting the uppermost tier of said ducts, and a continuous slab of superimposed self-hardening material hardened in position upon the upper surface of said filling and upper tier of ducts or pipes, said slab extending across the space between said laterally-spaced walls and enveloping the upwardly-presented edges of the uppermost duct-spacing blocks, 5. In an underground conduit construction, the combination with a longitudinally-spaced series of transversely-arranged duct-spacing blocks, provided with upwardly-presented notches, of ducts seated in said notches, other ducts mounted above the first-mentioned ducts, intermediate duct-spacing blocks arranged between the first-mentioned and second-mentioned ducts, a top series of longitudinally-spaced transversely-arranged duct-spacing blocks in engagement with the second-mentioned ducts, and a continuous integral mass of structurally competent material extending across said top series of longitudinally - spaced transversely - arranged duct-spacing blocks, the upper edges of the last-mentioned blocks being embedded in the structurally-competent material and portions of said continuous integral mass of material being conformed to the upper outer walls of the second-mentioned ducts.

6. An underground conduit construction comprising a plurality of bottom duct-spacing blocks provided with upwardly-presented notches, said bottom duct-spacing blocks being arranged transversely to said underground conduit construction and spaced longitudinally with respect thereto, lower ducts seated in said notches and held thereby against relative lateral displacement, lower intermediate duct-spacing blocks provided with downwardly-presented notches interengaging with said lower ducts, upper intermediate duct-spacing blocks provided with upwardly-presented notches, upper ducts seated in the notches in said upper intermediate duct-spacing blocks, top duct-spacing blocks provided with downwardly-presented notches interengaging with said upper ducts, and a continuous integral mass of structurally competent material extending across said top duct-spacing blocks and having the upper edges of said top duct-spacing blocks embedded therein.

7. In an underground conduit construction, the combination with a plurality of longitudinally - spaced transversely - arranged duct-positioning supports, of ducts supported and positioned by said duct-positioning supports, and a continuous integral slab within which the upper edges of said duct-positioning supports are embedded.

8. In an underground conduit construction adapted to be built up within a trench, the combination with a plurality of longitudinally-spaced transversely-arranged duct-positioning supports comprising bottom, intermediate and upper duct-spacing blocks, of a mass of loose material filling each of the spaces extending around said ducts between successive duct-positioning supports, said masses of loose material being confined between the lateral walls of said trench, and a continuous integral mass of structurally competent material hardened in position across all of said upper duct-spacing blocks and resting upon the upper surfaces of said masses of loose material, the upper edges of said upper duct-spacing blocks being thereby embedded in said continuous mass of structurally competent material.

9. In an underground conduit construction, the combination with duct-positioning supports, of ducts carried by said duct-positioning supports, said duct-positioning supports including spacing blocks transversely arranged with respect to and interlocking with said ducts for preventing lateral displacement thereof, and a continuous slab of self-hardening material hardened in position above said ducts and across and around the upper edges of said duct-positioning supports for rigidly locating said ducts.

10. In an underground conduit construction, the combination of duct-positioning supports transversely arranged along said conduit construction, said duct-positioning supports including duct-spacing blocks provided with upwardly-presented notches, and other duct-spacing blocks transversely arranged and provided with downwardly-presented notches, ducts arranged between the first-mentioned and the second-mentioned duct-spacing blocks, said ducts being held against relative lateral displacement by the notches in said blocks, and a continuous slab of self-hardening material hardened in position above said ducts and with the upper edges of the second-mentoned duct-spacing blocks embedded therein.

GUION M. GEST.